(12) United States Patent
Sasaki

(10) Patent No.: US 12,497,685 B2
(45) Date of Patent: Dec. 16, 2025

(54) COATED TOOL

(71) Applicant: MOLDINO TOOL ENGINEERING, LTD., Tokyo (JP)

(72) Inventor: Tomoya Sasaki, Narita (JP)

(73) Assignee: MOLDINO Tool Engineering, Ltd., Tokyo (JP)

( * ) Notice: Subject to any disclaimer, the term of this patent is extended or adjusted under 35 U.S.C. 154(b) by 132 days.

(21) Appl. No.: 18/682,945

(22) PCT Filed: Aug. 19, 2022

(86) PCT No.: PCT/JP2022/031386
§ 371 (c)(1),
(2) Date: Feb. 12, 2024

(87) PCT Pub. No.: WO2023/022230
PCT Pub. Date: Feb. 23, 2023

(65) Prior Publication Data
US 2024/0352572 A1    Oct. 24, 2024

(30) Foreign Application Priority Data

Aug. 19, 2021    (JP) ................................. 2021-134034

(51) Int. Cl.
*C23C 14/06*  (2006.01)
*B23B 27/14*  (2006.01)
(Continued)

(52) U.S. Cl.
CPC ........ *C23C 14/0641* (2013.01); *B23B 27/148* (2013.01); *C23C 14/022* (2013.01); *C23C 14/345* (2013.01); *B23B 2228/105* (2013.01)

(58) Field of Classification Search
None
See application file for complete search history.

(56) References Cited

U.S. PATENT DOCUMENTS

| | | | |
|---|---|---|---|
| 2011/0117344 A1* | 5/2011 | Chen ................... | C23C 14/0641 501/98.4 |
| 2017/0342552 A1 | 11/2017 | Sato et al. | |
| 2022/0176462 A1* | 6/2022 | Yamasaki ........... | C23C 14/0641 |

FOREIGN PATENT DOCUMENTS

| | | |
|---|---|---|
| JP | 2009-061514 A | 3/2009 |
| JP | 2009-203485 A | 9/2009 |

(Continued)

OTHER PUBLICATIONS

International Search Report mailed Sep. 20, 2022, issued for PCT/JP2022/031386 and English translation thereof.
(Continued)

*Primary Examiner* — Seth Dumbris
(74) *Attorney, Agent, or Firm* — Troutman Pepper Locke LLP

(57) ABSTRACT

A coated tool of the present invention includes a substrate and a hard coating on the substrate. The hard coating is a nitride or a carbonitride containing 65 atom % or more and 90 atom % or less of Al and 10 atom % or more and 35 atom % or less of Cr with respect to a total amount of metal elements including metalloid elements, and containing 0.50 atom % or less of argon (Ar), and has a face-centered cubic lattice structure. The hard coating shows a maximum intensity Ia in an α angle range of 80° to 90° in an X-ray intensity distribution on an α-axis in a positive pole figure of a (111) plane of the face-centered cubic lattice structure, and an intensity in an α angle range of 0° to 70° is 35% or less of the maximum intensity Ia.

4 Claims, 3 Drawing Sheets

(51) Int. Cl.
  *C23C 14/02*  (2006.01)
  *C23C 14/34*  (2006.01)

(56) References Cited

FOREIGN PATENT DOCUMENTS

| | | |
|---|---|---|
| JP | 2010-094761 A | 4/2010 |
| JP | 2010-094764 A | 4/2010 |
| JP | 2016-032861 A | 3/2016 |
| JP | 2016-107397 A | 6/2016 |
| JP | 2018-059146 A | 4/2018 |
| JP | 2020-040175 A | 3/2020 |
| JP | 2021-112805 A | 8/2021 |

OTHER PUBLICATIONS

International Preliminary Report on Patentability mailed Jan. 17, 2023, issued for PCT/JP2022/031386 and English translation thereof.

* cited by examiner

COATED TOOL

TECHNICAL FIELD

The present invention relates to a coated tool applied to a tool such as a mold or a cutting tool.

Priority is claimed on Japanese Patent Application No. 2021-134034, filed Aug. 19, 2021, the content of which is incorporated herein by reference.

BACKGROUND ART

An AlCr nitride is a film type having excellent wear resistance and heat resistance, and is widely applied to coated molds or coated cutting tools. In recent years, coated tools coated with an Al-rich AlCr nitride having an Al content ratio of more than 70 atom % using an are ion plating method have started to be proposed (Patent Documents 1 to 3).

CITATION LIST

Patent Documents

[Patent Document 1]
 Japanese Unexamined Patent Application, First Publication No. 2016-032861
[Patent Document 2]
 Japanese Unexamined Patent Application, First Publication No. 2018-059146
[Patent Document 3]
 Japanese Unexamined Patent Application, First Publication No. 2020-040175

SUMMARY OF INVENTION

Problems to be Solved by the Invention

In a small-diameter tool having a tool diameter of 2 mm or less, the influence of droplets on the tool performance is likely to become large. The present inventors have confirmed that an Al-rich AlCr nitride, the coating of which is performed by an arc ion plating method, is likely to have many droplets, and there is room for improvement in the durability of a tool.

The number of droplets can be reduced by using a sputtering method in the formation of a hard coating. However, in a case where a hard coating is simply formed using the sputtering method, wear resistance may be inferior to that of a hard coating formed using the arc ion plating method.

The present invention has been made in view of the above-described circumstances, and an object of the present invention is to provide a coated tool provided with an Al-rich AlCr nitride or carbonitride that realizes durability equal to or higher than in the case of using an arc ion plating method while reducing the number of droplets through the application of a sputtering method.

Means for Solving the Problem

According to one aspect of the present invention, there is provided a coated tool including a substrate and a hard coating on the substrate. The hard coating is a nitride or a carbonitride containing 65 atom % or more and 90 atom % or less of Al and 10 atom % or more and 35 atom % or less of Cr with respect to a total amount of metal elements including metalloid elements, and containing 0.50 atom % or less of argon (Ar) with respect to a total amount of the metal elements including metalloid elements and non-metal elements, and has a face-centered cubic lattice structure. The hard coating shows a maximum intensity Ia in an $\alpha$ angle range of 80° to 90° in an X-ray intensity distribution on an $\alpha$-axis in a positive pole figure of a (111) plane of the face-centered cubic lattice structure, and an intensity in an $\alpha$ angle range of 0° to 70° is 35% or less of the maximum intensity Ia.

The intensity in the $\alpha$ angle range of 0° to 70° is 30% or less of the Ia.

In the hard coating, the (111) plane of the face-centered cubic lattice structure shows a maximum intensity in an intensity profile of an X-ray diffraction or a selected-area diffraction pattern of a transmission electron microscope.

Effects of the Invention

According to the present invention, it is possible to obtain the coated tool provided with a sputtered coating of an Al-rich AlCr nitride or carbonitride and having excellent durability.

EMBODIMENT FOR IMPLEMENTING THE INVENTION

Figure 1:
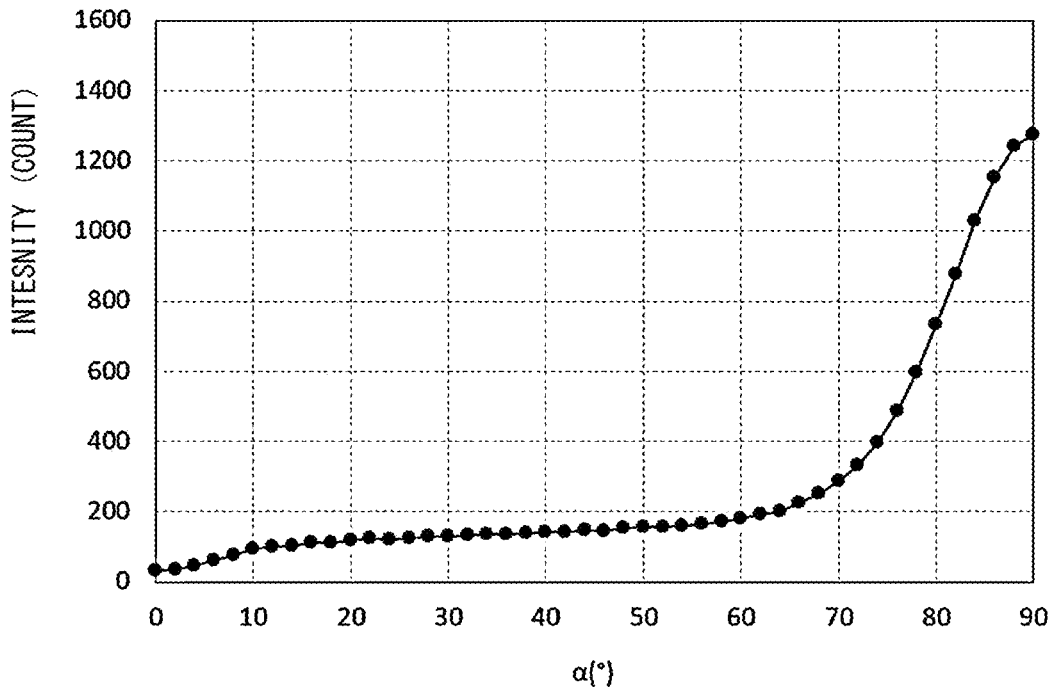
FIG. 1 shows one example of an X-ray intensity distribution on an $\alpha$-axis in a positive pole figure of (111) planes in an AlCr nitride of Example 1.

The present inventors have found that in an Al-rich AlCr nitride or carbonitride obtained by a sputtering method, when orientations of crystals having a face-centered cubic lattice structure are controlled, durability tends to be improved. Hereinafter, the details of an embodiment of the present invention will be described.

A coated tool of the present embodiment is a coated tool including an Al-rich nitride or carbonitride mainly composed of Al and Cr on a surface of a substrate. The coated tool of the present embodiment can be applied to molds or cutting tools. Particularly, the present invention is applied to small-diameter end mills having a tool diameter of preferably 5 mm or less, still more preferably 3 mm or less.

In the present embodiment, the substrate is not particularly limited. Cold tool steel, hot tool steel, high-speed steel, cemented carbide, or the like may be applied according to the application as appropriate. The substrate may be subjected to a nitriding treatment, a bombardment treatment, or the like in advance.

A hard coating according to the present embodiment is a nitride or a carbonitride, and contains 65 atom % or more and 90 atom % or less of Al and 10 atom % or more and 35 atom % or less of Cr with respect to the total amount of metal (including metalloids and the same applies hereinafter) elements. A nitride or a carbonitride mainly composed of Al and Cr is a film type having an excellent balance between wear resistance and heat resistance, and has excellent adhesion to the substrate, and the heat resistance of the hard coating is further improved particularly by increasing the Al content ratio. It is preferable that the hard coating according to the present embodiment is a nitride having more excellent heat resistance. In addition, by increasing the Al content ratio, an oxidation protection film is easily formed on the tool surface, and the coating structure is made fine, so that wear of the hard coating due to welding is easily suppressed.

In order to sufficiently demonstrate the above-described effect of adding Al, in the hard coating according to the present embodiment, when the total amount of the metal elements is set to 100 atom %, the Al content ratio is set to 65 atom % or more. Further, the Al content ratio is preferably 70 atom % or more. Further, the Al content ratio is preferably 75 atom % or more. On the other hand, when the Al content ratio is too large, the crystal structure of the hard coating changes, and the hard coating becomes fragile. For this reason, in the hard coating according to the present embodiment, when the total amount of the metal elements is set to 100 atom %, the Al content ratio is set to 90 atom % or less. Further, the Al content ratio is preferably 85 atom % or less. Further, the Al content ratio is preferably 78 atom % or less.

In the hard coating according to the present embodiment, when the total amount of the metal elements is set to 100 atom %, the Cr content ratio is set to 10 atom % or more. Accordingly, a uniform and dense oxidation protection film is easily formed on the tool surface during processing, and damage to the tool is easily suppressed. Further, the Cr content ratio is preferably set to 15 atom % or more. On the other hand, when the Cr content ratio contained in the hard coating is too large, it is difficult to obtain the above-described effect of increasing the Al content ratio. For this reason, in the hard coating according to the present embodiment, when the total amount of the metal elements is set to 100 atom %, the Cr content ratio is set to 35 atom % or less. Further, the Cr content ratio is preferably 30 atom % or less. Further, the Cr content ratio is preferably 25 atom % or less. Further, the Cr content ratio is preferably 20 atom % or more.

In the hard coating according to the present embodiment, when the total amount of the metal elements is set to 100 atom %, the total Al and Cr content ratio is preferably set to 90 atom % or more. In addition, the hard coating according to the present embodiment may be a nitride or a carbonitride of Al and Cr.

The content ratios of the metal elements of the hard coating according to the present embodiment can be measured for the mirror-finished hard coating using an electron probe micro analyzer (EPMA). In this case, for example, after a surface of the hard coating is mirror-finished, analysis was performed at five points where each analysis range is approximately 1 μm in diameter, and the content ratio can be obtained from an average of the analysis results.

The hard coating according to the present embodiment may contain metal elements other than Al and Cr. For example, for the purpose of improving wear resistance and heat resistance, the hard coating according to the present embodiment can also contain one element or two or more elements selected from elements of Groups 4a, 5a, and 6a of the periodic table and Si, B, Y, Yb, and Cu. These elements are generally contained to improve coating properties of the coated tool, and can be added within a range that does not significantly deteriorate the durability of the coated tool. However, when the content ratios of the metal elements other than Al and Cr are too large, the durability of the coated tool may be deteriorated. For this reason, in a case where the hard coating according to the present embodiment contains metal elements other than Al and Cr, when the total amount of the metal elements is set to 100 atom %, the total content ratio thereof is preferably 10 atom % or less. Further, the total content ratio thereof is preferably 5 atom % or less.

The hard coating according to the present embodiment contains 0.50 atom % or less of argon (Ar) with respect to the total amount of the metal elements and non-metal elements. The hard coating according to the present embodiment is a sputtered film, and is a sputtered hard coating. The frequency of occurrence of droplets that become defects in the hard coating can be reduced by applying a sputtering method. On the other hand, since a target component is sputtered using argon ions in the sputtering method, the hard coating coated by the sputtering method may contain a considerable amount of argon. Particularly, argon is likely to concentrate at grain boundaries, and when the grain size becomes finer, the argon content ratio tends to increase. However, when the argon content ratio increases, the bonding force between grains at the grain boundaries decreases. As in the hard coating according to the present embodiment, in a hard coating having a high Al content ratio, since argon contained in excess may become defects, it is effective to keep the Ar content ratio to a certain level or less. Specifically, the hard coating according to the present embodiment contains 0.50 atom % or less of argon with respect to the total amount of the metal elements and non-metal elements. Further, the argon content is preferably set to 0.40 atom % or less.

When sputtering is performed using a mixed gas containing a rare gas other than argon, the hard coating according to the present embodiment may also contain the rare gas other than argon.

In the sputtering method, when the argon content ratio contained in the hard coating is brought as close to 0 atom % as possible, the flow rate of argon becomes too small, and sputtering becomes unstable. In addition, even if the argon content ratio is brought close to 0 atom %, basic properties of the hard coating applied to cutting tools, such as toughness, heat resistance, and wear resistance, may be impaired. In the hard coating according to the present embodiment, the lower limit of the argon content ratio is not particularly limited; however, in order to stabilize the sputtering method and ensure the basic properties of the hard coating applied to the coated tool, it is preferable that argon is contained in an amount of 0.02 atom % or more with respect to the total amount of the metal elements and non-metal elements. Further, the argon content ratio is preferably set to 0.05 atom % or more. Further, the argon content ratio is preferably set to 0.10 atom % or more.

Similarly to the above-mentioned measurement of the content ratios of the metal elements, the nitrogen content ratio and the argon content ratio of the hard coating according to the present embodiment can be measured for the mirror-finished hard coating using an electron probe micro analyzer (EPMA). Similarly to the above-mentioned measurement of the content ratios of the metal elements, after mirror-finishing, analysis was performed at five points where each analysis range is approximately 1 μm in diameter, and the nitrogen content ratio and the argon content ratio can be obtained from an average of the analysis results.

The hard coating according to the present embodiment may contain very small amounts of argon, oxygen, and carbon as non-metal elements in addition to nitrogen.

<Crystal Structure>

The hard coating according to the present embodiment has a face-centered cubic lattice structure, and in an X-ray intensity distribution on an α-axis in a positive pole figure of (111) planes of the face-centered cubic lattice structure, a maximum intensity Ia is shown in an α angle range of 80° to 90°, and an intensity in an α angle range of 0° to 70° is 35% or less of the maximum intensity Ia. Accordingly, the intensity in the α angle range of 0° to 70° is relatively lower than the maximum intensity at an α angle of 80° to 90°, so that many (111) planes exist at an α angle of 80° to 90° in a direction substantially perpendicular to a substrate in-plane direction. It is considered that by orienting the (111) planes in the direction substantially perpendicular to the substrate in-plane direction, the entirety of the hard coating is made more dense, and durability is improved. It is preferable that the maximum intensity Ia is shown in the α angle range of 85° to 90°. The intensities of the (111) planes in the α angle range of 0° to 70° are preferably 30% or less and still more preferably 25% or less of the maximum intensity Ia.

In the hard coating according to the present embodiment, it is preferable that the (111) planes of the face-centered cubic lattice structure exhibit a maximum intensity in an intensity profile of an X-ray diffraction or an electron diffraction pattern. It is considered that by orienting, in substantially the same direction, the (111) planes of the face-centered cubic lattice structure which exhibit the maximum intensity, the wear resistance of the hard coating is enhanced, and the durability of the coated tool is improved.

In an X-ray diffraction, the peak intensity of the (111) planes is preferably four or more times the peak intensity of (200) planes. According to these configurations, the wear resistance of the hard coating is further improved, and the durability of the coated tool is further improved. The upper limit of the ratio of the peak intensity of the (111) planes to the peak intensity of the (200) planes is preferably 8 or less.

<Interlayer Coat and Upper Layer>

In the coated tool of the present invention, in order to further improve adhesion of the hard coating, an intermediate coating may be separately provided between the substrate of the tool and the hard coating, if necessary. For example, a layer made of any of metal, nitride, carbonitride, and carbide may be provided between the substrate of the tool and the hard coating.

In addition, a hard coating having a different component ratio or a different composition from the hard coating according to the present embodiment may be separately formed on the hard coating according to the present embodiment. Further, the hard coating according to the present embodiment and a separate hard coating having a different composition ratio or a different composition from the hard coating according to the present embodiment may be laminated on each other.

<Droplet>

In the hard coating according to the present embodiment, in a cross-sectional observation, the number of droplets having an equivalent circle diameter of 1 μm or more is preferably 5 or less per 100 μm². In an arc ion plating method, "droplets" in the present specification are deposits on the hard coating caused by molten particles of approximately 1 to several tens of μm flying out from a cathode. In the sputtering method, "droplets" in the present specification are deposits on the hard coating caused by metal particles of approximately 1 to several tens of μm suddenly scattered from a target.

In the hard coating coated by a physical vapor deposition method, droplets may become main physical defects. Particularly, since coarse droplets having an equivalent circle diameter of 1 μm or more may become starting points for breakages inside the hard coating, the toughness of the hard coating can be enhanced by reducing the frequency of occurrence of the droplets. In the present embodiment, in a cross-sectional observation of the hard coating, the number of droplets having an equivalent circle diameter of 1 μm or more is preferably set to 5 or less per 100 μm². More preferably, the number of droplets is 3 or less per 100 μm². Still more preferably, the number of droplets is 1 or less per 100 μm². Further, it is preferable that droplets having an equivalent circle diameter of 5 μm or more are not contained.

In addition, the number of droplets having an equivalent circle diameter of 1 μm or more on the surface of the hard coating is preferably 5 or less per 100 μm². More preferably, the number of droplets on the surface of the hard coating is 3 or less per 100 μm². Still more preferably, the number of droplets on the surface of the hard coating is 1 or less per 100 μm².

In evaluating droplets in a cross-sectional observation of the hard coating, the hard coating is mirror-finished and then processed using a focused ion beam method, and a mirror-finished surface is observed in a plurality of visual fields at a magnification of 5,000 to 10,000 times using a transmission electron microscope. In addition, the number of droplets on the surface of the hard coating can be obtained by observing the surface of the hard coating using a scanning electron microscope (SEM) or the like.

<Manufacturing Method>

In coating the hard coating according to the present embodiment, it is preferable to apply a sputtering method in which three or more AlCr alloy targets are used, electric power is sequentially applied to the targets, and when the target to which electric power is applied is switched, a time for which electric power is simultaneously applied to both the target to which the application of electric power is ended and the target to which the application of electric power is started is provided. In such a sputtering method, a state where the ionization rates of the targets are high is maintained during coating, hard coatings that are dense at micro level are obtained, and there is a tendency that argon or oxygen which are inevitably contained is small in content. Then, it is preferable that the internal furnace temperature of a sputtering apparatus is set to 350° C. to 500° C., the negative bias voltage applied to the substrate is set to −200 V to −70 V, and Ar gas and $N_2$ gas are introduced to set the internal furnace pressure to 0.1 Pa to 0.4 Pa. In the case of coating with a carbonitride, a very small amount of carbon may be added to the targets, or some of the reaction gas may be replaced with methane gas.

The maximum electric power density of an electric power pulse is preferably set to 0.1 kW/cm² or more. The maximum electric power density is still more preferably set to 0.3 kW/cm² or more. In addition, in the present composition system, when the energy of film-forming ions is too high, an hcp structure is easily formed. For this reason, the maximum electric power density of an electric power pulse is preferably set to 0.7 kW/cm² or less. The maximum electric power density is still more preferably set to 0.6 kW/cm² or less. The time of application of the electric power pulse to individual targets is preferably set to 30 milliseconds or less. In addition, the time for which electric power is simultaneously applied to both the alloy target to which the application of electric power is ended and the alloy target to which the application of electric power is started is preferably set to 20 microseconds or more and 100 microseconds or less.

Example 1

<Substrate>

As a substrate, a 2-flute ball end mill made of a cemented carbide having a composition of WC (bal.)-Co (8.0% by mass)-VC (0.3% by mass)-$Cr_3C_2$ (0.5% by mass) and a hardness of 94.0 HRA (Rockwell hardness, a value measured in accordance with JIS G 0202) was prepared.

In Example 1 and Comparative Example 3, a sputtering apparatus in which six sputtering evaporation sources can be mounted was used. Among these vapor deposition sources, six Al75Cr25 alloy targets (the numerical values are atomic ratios, the same applies hereinafter) were installed in the apparatus as vapor deposition sources to perform the coating of a hard coating.

In Comparative Example 2, a sputtering apparatus in which six sputtering evaporation sources can be mounted was used. Among these vapor deposition sources, six Al80Cr20 alloy targets were installed in the apparatus as vapor deposition sources to perform the coating of a hard coating.

A tool that was the substrate was fixed to a sample holder in the sputtering apparatus, and a bias power supply was connected to the tool. The bias power supply has a structure in which a negative bias voltage is applied to the tool independently of the targets. The tool rotates at two revolutions per minute, and revolves via a fixing jig and the sample holder. The distance between the tool and the target surfaces was set to 100 mm.

As introduction gases, Ar and $N_2$ were used, and the introduction gas was introduced from a gas supply port provided in the sputtering apparatus.

<Bombardment Treatment>

First, before the tool was coated with a hard coating, a bombardment treatment was performed on the tool in the following procedure. Heating was performed for 30 minutes in a state where the internal furnace temperature was set to 400° C. by a heater in the sputtering apparatus. Thereafter, the inside of the furnace of the sputtering apparatus was evacuated to set the internal furnace pressure to $5.0 \times 10^{-3}$ Pa or less. Then, the Ar gas was introduced into the furnace of the sputtering apparatus, and the internal furnace pressure was adjusted to 0.8 Pa. Then, a DC bias voltage of −170 V was applied to the tool, and cleaning (bombardment treatment) was performed on the tool by Ar ions for 20 minutes or more.

<Coating of Hard Coating>

In the coating of Example 1, the internal furnace temperature was set to 400° C., and Ar gas (0.2 Pa) and $N_2$ gas (0.1 Pa) were introduced into the furnace of the sputtering apparatus to set internal furnace pressure to 0.3 Pa. A DC bias voltage was applied to the substrate, the overlapping time of electric power applied to the targets was set to 50 microseconds, and the discharge time per cycle of electric power applied to each target was set to 1 millisecond. Then, the negative pressure bias voltage applied to the substrate was set to −120 V, the maximum electric power was set to 0.4 kW/cm², and electric power was continuously applied to the six Al75Cr25 alloy targets to coat a surface of the substrate with a hard coating of approximately 3.0 μm.

In the coating of Comparative Example 2, the internal furnace temperature was set to 400° C., and Ar gas (0.2 Pa) and $N_2$ gas (0.1 Pa) were introduced into the furnace of the sputtering apparatus to set the internal furnace pressure to 0.3 Pa. A DC bias voltage was applied to the substrate, the overlapping time of electric power applied to the targets was set to 50 microseconds, and the discharge time per cycle of electric power applied to each target was set to 1 millisecond. Then, the negative pressure bias voltage applied to the substrate was set to −120 V, the maximum electric power was set to 0.8 kW/cm², and electric power was continuously applied to the six Al80Cr20 alloy targets to coat the surface of the substrate with a hard coating of approximately 3.0 μm.

In the coating of Comparative Example 3, the internal furnace temperature was set to 400° C., and Ar gas (0.2 Pa) and $N_2$ gas (0.1 Pa) were introduced into the furnace of the sputtering apparatus to set the internal furnace pressure to 0.3 Pa. A DC bias voltage was applied to the substrate, the overlapping time of electric power applied to the targets was set to 50 microseconds, and the discharge time per cycle of electric power applied to each target was set to 1 millisecond. Then, the negative pressure bias voltage applied to the substrate was set to −120 V, the maximum electric power was set to 0.8 kW/cm², and electric power was continuously applied to the six Al75Cr25 alloy targets to coat the surface of the substrate with a hard coating of approximately 3.0 μm.

In Comparative Example 1, an arc ion plating apparatus was used. An Al60Cr40 alloy target was installed in the apparatus as a vapor deposition source. First, cleaning (bombardment treatment) was performed on the tool by Ar ions. Next, the internal furnace pressure of the arc ion plating apparatus was set to $5.0 \times 10^{-3}$ Pa or less by evacuation, the internal furnace temperature was set to 500° C., and $N_2$ gas was introduced to set the internal furnace pressure to 3.2 Pa. Next, a DC bias voltage of −100 V was applied to the tool, and a current of 150 A was applied to the Al60Cr40 alloy target to coat the surface of the tool with a hard coating of approximately 3.0 μm. Comparative Example 1 has a composition generally used in the market.

A coating composition of the hard coating was measured by wavelength-dispersive electron probe micro analyzer (WDS-EPMA) attached to an electron probe micro analyzer (JXA-8500F manufactured by JEOL Ltd.). The ball end mill for the evaluation of physical properties was mirror-finished, the acceleration voltage was set to 10 kV, the irradiation current was set to $5 \times 10^{-8}$ A, the acquisition time was set to 10 seconds, measurement was performed at five points where each analysis region is 1 μm in diameter, and metal content ratios and an Ar content ratio in the total of metal components and non-metal components of the hard coating were obtained from the average value of the analysis results.

The crystal structure was confirmed using an X-ray diffractometer (EMPYREA manufactured by PaNalytical Corporation) under measurement conditions where the tube voltage was 45 kV, the tube current was 40 mA, the X-ray source was Cuk α ($\lambda$=0.15405 nm), and 2θ was 20 to 80 degrees.

The coating hardness and the elastic modulus of the hard coating were analyzed using a nanoindentation tester (ENT-2100 manufactured by Elionix Inc.). For the analysis, after a coating cross-section at which a test piece was inclined 5 degrees with respect to an outermost surface of the coating was mirror-polished, and a region where the maximum indentation depth in the polished surface of the coating was less than approximately 1/10 of a coating thickness was selected. Measurement was performed at 15 points under a measurement condition where the indentation load was 9.807 mN, and the coating hardness and the elastic modulus were obtained from the average values of five points excluding five points on a large value side and five points on a small value side.

Table 1 shows the coating compositions and the results of evaluating the physical properties.

TABLE 1

| Sample No | Composition (atom %) | Crystal structure | Ar (atom %) | Hardness (GPa) | Elastic modulus (GPa) | XRD (111)/(200) |
|---|---|---|---|---|---|---|
| Example 1 | (Al75Cr25) N | fcc | 0.30 | 38 | 556 | 6.7 |
| Comparative Example 1 | (Al60Cr40) N | fcc | 0 | 33 | 536 | 0.5 |
| Comparative Example 2 | (Al80Cr20) N | hcp | 0.34 | 22 | 324 | — |
| Comparative Example 3 | (Al75Cr25) N | hcp | 0.28 | 22 | 311 | — |

As the results of X-ray diffraction, Example 1 and Comparative Example 1 had a face-centered cubic lattice structure (fcc structure), whereas Comparative Examples 2 and 3 had a close-packed hexagonal lattice structure (hcp structure).

An X-ray intensity distribution using a positive pole figure was evaluated for Example 1 and Comparative Example 1 having an fcc structure. Measurement conditions for the X-ray intensity distribution using the positive pole figure were as follows. When a normal line of the sample surface was on a plane determined by an incident line and a diffraction line, the α angle was set to 90°. When the α angle was 90°, the α angle became a central point on the positive pole figure.

Tube bulb: Cuα ray
Output: 45 kV, 200 mA
Beam: Parallel method
Optical system: In-plane
Detector: D/teX Ultra 250
Solar slit opening angle: 0.5 deg.
Incident slit width: 1.0 mm
Light-receiving slit width: 1.0 mm
Scanning method: Concentric circle
β scanning range: 0° to 360°/3.0° step
2θ fixed angle: The diffraction angle of (111) planes was set to an angle at which the diffraction intensity was at its highest between 36.0° and 39.0°. The diffraction angle of (200) planes was set to an angle at which the diffraction intensity was at its highest between 42.0° and 45.0°. Crystal planes were identified from CrN.
α scanning range: 0 to 90°/3.0° step

TABLE 2

| | (111) plane | | | (200) plane | |
|---|---|---|---|---|---|
| Sample No | Maximum peak angle (α°) | Maximum peak intensity | α angle range of 0° to 70° | Maximum peak angle (α°) | Maximum peak intensity |
| Example 1 | 90 | 1276 | 287 | 44 | 438 |
| Comparative Example 1 | 52 | 233 | 233 | 74 | 602 |

Figure 2:
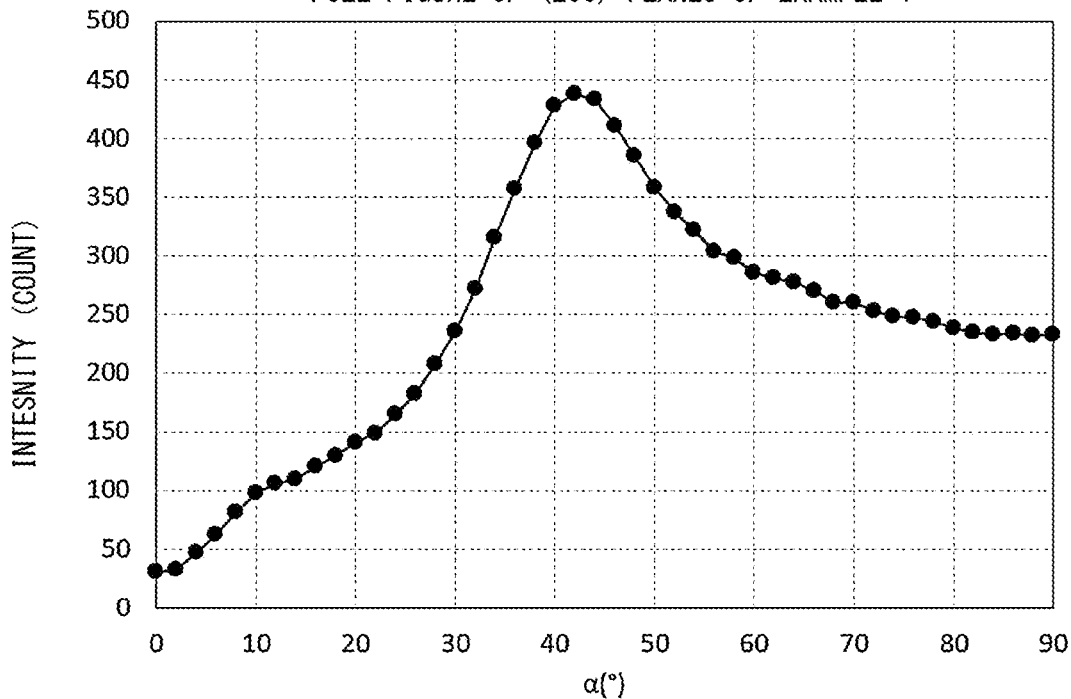
FIG. 2 shows one example of an X-ray intensity distribution on an $\alpha$-axis in a positive pole figure of (200) planes in the AlCr nitride of Example 1.

FIG. 1 shows one example of an X-ray intensity distribution on an α-axis in a positive pole figure of (111) planes of Example 1. FIG. 2 shows one example of an X-ray intensity distribution on an α-axis in a positive pole figure of (200) planes of Example 1.

Figure 3:
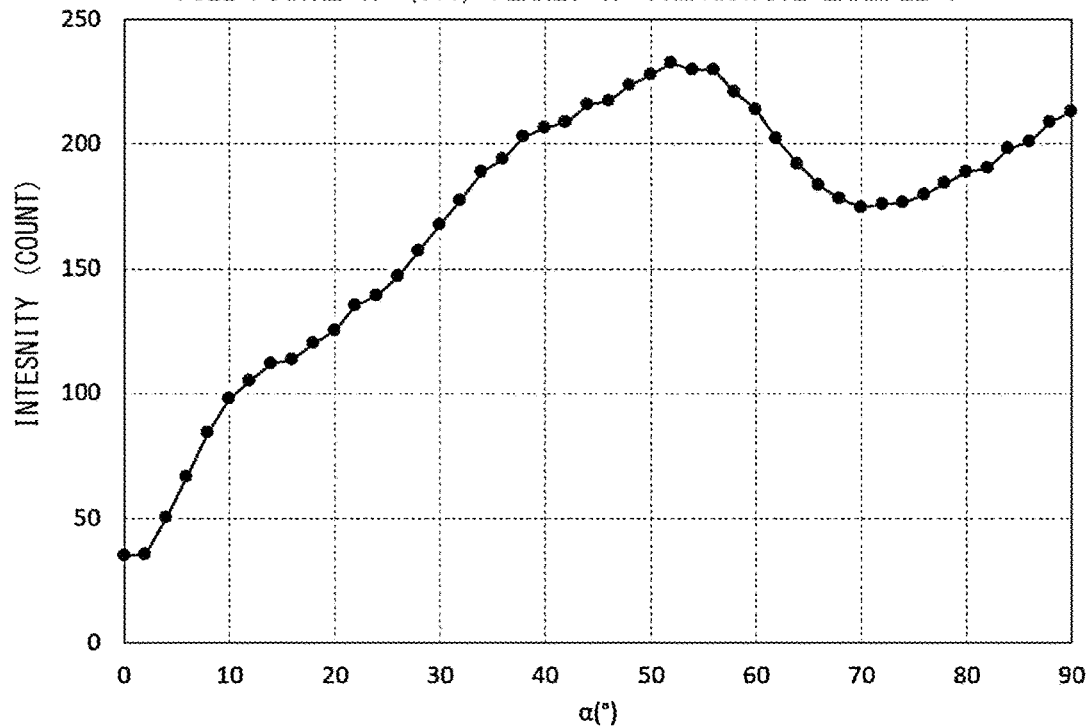
FIG. 3 shows one example of an X-ray intensity distribution of an $\alpha$-axis in a positive pole figure of (111) planes in an AlCr nitride of Comparative Example 1.
Figure 4:
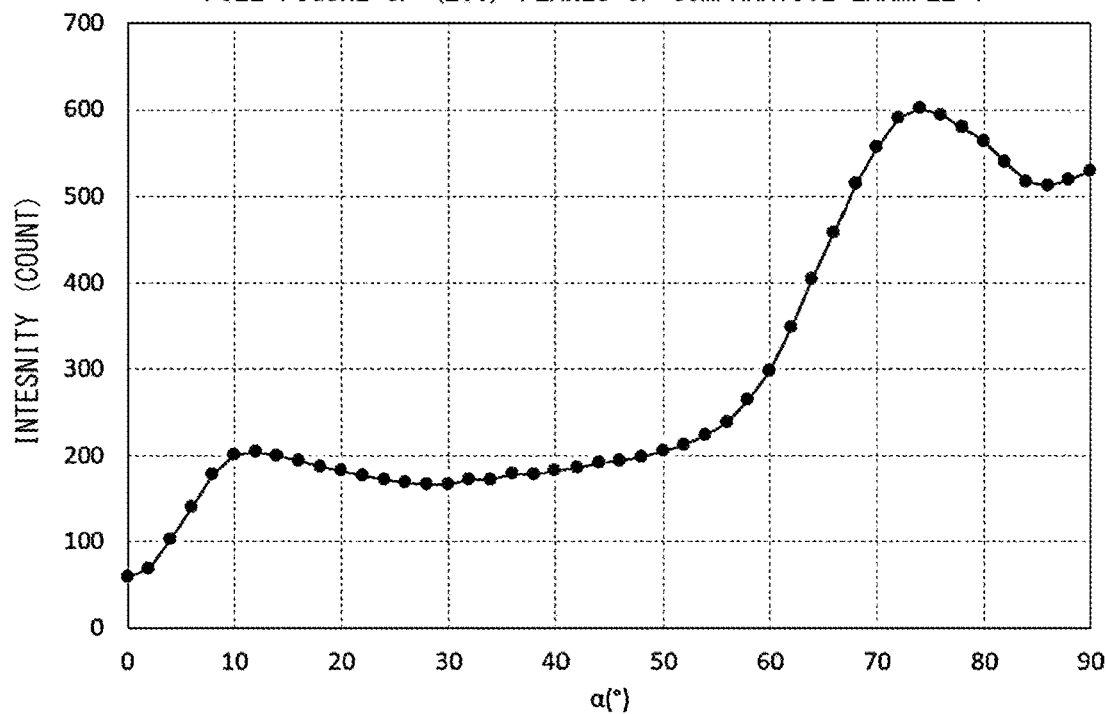
FIG. 4 shows one example of an X-ray intensity distribution of an $\alpha$-axis in a positive pole figure of (200) planes in the AlCr nitride of Comparative Example 1.

FIG. 3 shows one example of an X-ray intensity distribution on an α-axis in a positive pole figure of (111) planes of Comparative Example 1. FIG. 4 shows one example of an X-ray intensity distribution on an α-axis in a positive pole figure of (200) planes of Comparative Example 1.

From FIG. 1, it can be seen that the (111) planes of Example 1 have a maximum peak intensity at an α angle of 90°, has a low peak intensity in an α angle range of 0° to 70°, and are strongly oriented in a narrow α angle range of 80° to 90°. Table 2 shows peak intensity values read from the diagram. The (111) planes of Example 1 showed the maximum intensity Ia (=1276) at an α angle of 90°, and the maximum intensity in the α-angle range of 0° to 70° was 287. It was confirmed that the intensity of the (111) planes of Example 1 in the α angle range of 0° to 70° was 22% of the maximum intensity Ia, and the (111) planes were strongly oriented at an α angle of 80° to 90°. Namely, the intensity of the (111) planes of Example 1 in the α angle range of 0° to 70° was 35% or less and 30% or less of the maximum intensity Ia.

Figure 5:
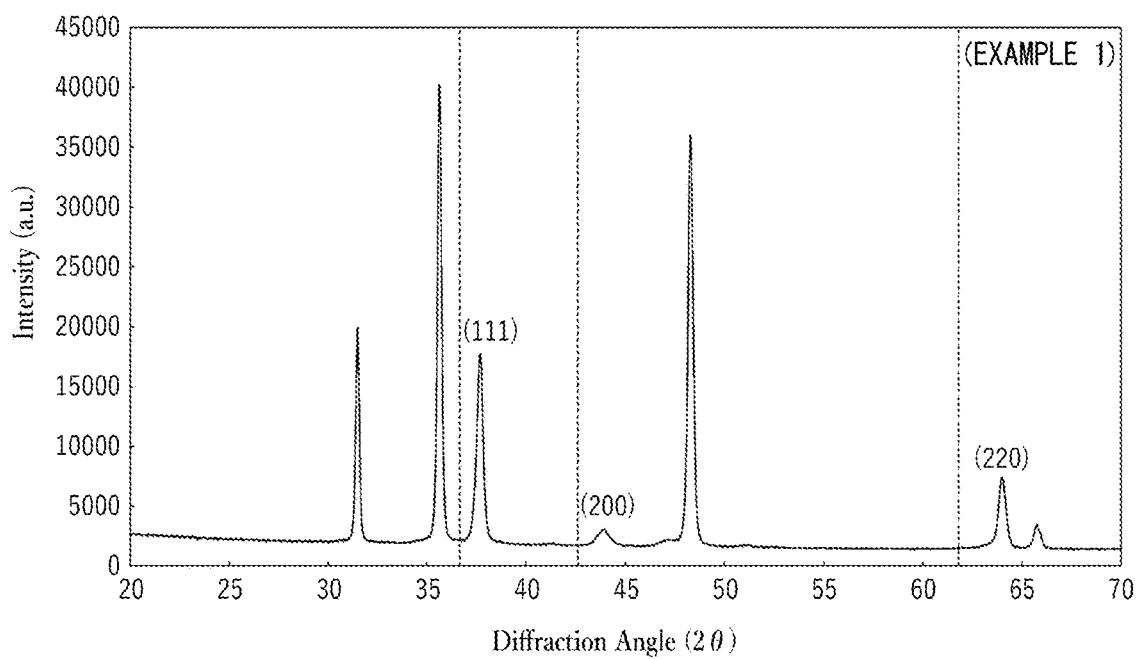
FIG. 5 is one example of an XRD measurement result of Example 1.

FIG. 5 shows one example of an XRD measurement result of AlCrN of Example 1. It was confirmed that in AlCrN of Example 1, the peak intensity of (111) of the face-centered cubic lattice structure showed the maximum intensity. In addition, in AlCrN of Example 1, the peak intensity of AlN having an hcp structure was not confirmed in XRD. In FIG. 5, three peaks for which the crystal planes (111), (200), and (220) are displayed are diffraction peaks caused by AlCrN of the face-centered cubic lattice structure. Other four peaks for which crystal planes are not displayed are all diffraction peaks caused by WC of the substrate.

As shown in Table 1, it was confirmed that the coated tool of Example 1 had the hard coating having a face-centered cubic lattice structure in which the (111) planes are strongly oriented at an α angle of 80° to 90°, thereby despite having an Al-rich composition, further increasing the coating hardness and the elastic modulus than those of Comparative Example 1. Further, according to the coated tool of Example 1, since the number of droplets is reduced by applying the sputtering method, a coating breakage caused by droplets can be suppressed compared to the coated tool of Comparative Example 1.

(Condition) Dry processing
Tool: 2-flute carbide ball end mill
Model number: EPDBE2010-6, ball radius 0.5 mm
Cutting method: Bottom cutting Work material: STAVAX (52 HRC) (manufactured by Bohler-Uddeholm Co., Ltd.)

Depth of cut: 0.03 mm in an axial direction, 0.03 mm in a radial direction

Cutting speed: 67.8 m/min

One blade feed amount: 0.0135 mm/blade

Cutting distance: 15 m

Evaluation method: After cutting, the work material was observed using a scanning electron microscope at a magnification of 1000 times to measure widths of abrasion between the tool and the work material on a flank face of the tool, and a portion having the largest abrasion width thereamong was defined as a flank face maximum wear width.

TABLE 3

| Sample No | Flank face maximum wear width (μm) |
|---|---|
| Example 1 | 10 |
| Comparative Example 1 | 15 |
| Comparative Example 2 | Peeling |
| Comparative Example 3 | Peeling |

It was confirmed that Example 1 had a smaller flank face maximum wear width and had more excellent durability than AlCrN used in the arc ion plating method of the related art.

The invention claimed is:

1. A coated tool comprising:
a substrate; and
a hard coating on the substrate,
wherein the hard coating is a nitride or a carbonitride containing 65 atom % or more and 90 atom % or less of Al and 10 atom % or more and 35 atom % or less of Cr with respect to a total amount of metal elements including metalloid elements, and containing 0.50 atom % or less of argon (Ar) with respect to a total amount of the metal elements including metalloid elements and non-metal elements, and has a face-centered cubic lattice structure, and
the hard coating shows a maximum intensity Ia in an $\alpha$ angle range of 80° to 90° in an X-ray intensity distribution on an $\alpha$-axis in a positive pole figure of a (111) plane of the face-centered cubic lattice structure, and an intensity in an a angle range of 0° to 70° is 35% or less of the maximum intensity Ia.

2. The coated tool according to claim 1,
wherein the intensity in the a angle range of 0° to 70° is 30% or less of the maximum intensity Ia.

3. The coated tool according to claim 1,
wherein in the hard coating, the (111) plane of the face-centered cubic lattice structure shows a maximum intensity in an intensity profile of an X-ray diffraction or a selected-area diffraction pattern of a transmission electron microscope.

4. The coated tool according to claim 2,
wherein in the hard coating, the (111) plane of the face-centered cubic lattice structure shows a maximum intensity in an intensity profile of an X-ray diffraction or a selected-area diffraction pattern of a transmission electron microscope.

* * * * *